(12) United States Patent
Penberthy et al.

(10) Patent No.: US 9,083,808 B2
(45) Date of Patent: Jul. 14, 2015

(54) UNKNOWN SPEAKER IDENTIFICATION SYSTEM

(71) Applicant: GE Aviation Systems Limited, Gloucestershire (GB)

(72) Inventors: Jonathon David Penberthy, Hampshire (GB); Lucas William Partridge, Hampshire (GB)

(73) Assignee: GE Aviation Systems Limited, Cheltenham (GB)

(*) Notice: Subject to any disclaimer, the term of this patent is extended or adjusted under 35 U.S.C. 154(b) by 0 days.

(21) Appl. No.: 14/258,162

(22) Filed: Apr. 22, 2014

(65) Prior Publication Data
US 2014/0314216 A1    Oct. 23, 2014

(30) Foreign Application Priority Data

Apr. 22, 2013 (GB) .................................. 1307244.2

(51) Int. Cl.
*H04B 10/00* (2013.01)
*H04M 3/56* (2006.01)
*G10L 17/00* (2013.01)

(52) U.S. Cl.
CPC ............. *H04M 3/568* (2013.01); *G10L 17/005* (2013.01)

(58) Field of Classification Search
CPC ............. H04M 1/19; H04M 2201/40; H04M 3/53325; H04M 3/533; H04M 3/42059; H04M 1/663; H04M 3/53; H04M 3/493; H04M 15/38; H04M 15/00; H04M 15/36; H04M 3/42042; H04Q 3/00; H04W 24/00
USPC .......... 379/88.01, 88.02, 88.18–88.21, 93.03, 379/118, 120, 127.01, 127.06, 183, 88.23; 455/415, 425
See application file for complete search history.

(56) References Cited

U.S. PATENT DOCUMENTS 6,457,043 B1   9/2002  Kwak et al.
7,099,448 B1   8/2006  Laniepce et al.
(Continued)

FOREIGN PATENT DOCUMENTS

EP   1798945 A1   6/2007
JP   2006270352 A  10/2006
JP   2007025859 A   2/2007

OTHER PUBLICATIONS

GB Search Report dated Aug. 23, 2013 which was issued in connection with GB Patent Application No. 1307244.2 which was filed on Apr. 22, 2013.
(Continued)

*Primary Examiner* — Akelaw Teshale
(74) *Attorney, Agent, or Firm* — General Electric Company; William S. Munnerlyn

(57) ABSTRACT

An apparatus for use in a verbal communication between a speaker and at least one listener, where the speaker and the at least one listener are spatially separate from each other, the apparatus provides the listener with a sensory output associated with the identity of the speaker, the apparatus including an identification device including a vibration sensor for detecting vibrations associated with speech of the speaker, is configured to store identification data representative of the identity of the speaker or the identification device, is associable with the identity of the speaker, and, in response to detecting vibrations, transmits an identification signal comprising or generated from the stored identification data, and a display device operable to receive the identification signal and to generate from the received identification signal a sensory output indicating the identity of either or both of the speaker and the identification device.

10 Claims, 5 Drawing Sheets

(56) References Cited

U.S. PATENT DOCUMENTS

| | | | |
|---|---|---|---|
| 7,305,078 B2 | 12/2007 | Kardos | |
| 7,629,897 B2* | 12/2009 | Koljonen | 340/4.13 |
| 7,664,246 B2 | 2/2010 | Krantz et al. | |
| 7,822,605 B2 | 10/2010 | Zigel et al. | |
| 7,920,158 B1 | 4/2011 | Beck et al. | |
| 8,209,183 B1* | 6/2012 | Patel et al. | 704/270 |
| 8,243,902 B2 | 8/2012 | Caspi | |
| 8,301,443 B2* | 10/2012 | Angell et al. | 704/231 |
| 2005/0135583 A1* | 6/2005 | Kardos | 379/142.01 |
| 2006/0079291 A1* | 4/2006 | Granovetter et al. | 455/563 |
| 2006/0247919 A1* | 11/2006 | Specht et al. | 704/201 |
| 2008/0255840 A1 | 10/2008 | Cutler | |
| 2009/0220065 A1 | 9/2009 | Ahuja et al. | |
| 2013/0080169 A1* | 3/2013 | Harada et al. | 704/249 |

OTHER PUBLICATIONS

Purcher, "Apple Invents a New Audio—Sharing Network Feature for iPhone", Patently Apple, http://www.patentlyapple.com/patently-apple/2012/07/apple-invents-a-new-audio-sharing-network-feature-for-iphone.html, Jul. 29, 2012.

Unofficial English translation of Office Action issued in connection with corresponding JP Application No. 2014-082405 on Mar. 31, 2015.

* cited by examiner

UNKNOWN SPEAKER IDENTIFICATION SYSTEM

TECHNICAL FIELD

The present invention relates to an apparatus, a kit of parts and a related method for use in a verbal communication between a speaker and a listener of a plurality of participants, where the listener cannot easily see who is speaking, the apparatus operable to provide the listener with a sensory output indicating the identity of the speaker.

BACKGROUND ART

There exist many circumstances requiring verbal communication between a speaker and a listener of a plurality of participants, where the separation of the speaker and the listener is such that it can be hard for the listener(s) to determine who spoke.

The difficulty can arise when the speaker and the listener(s) are located out of direct line of sight. One such example is the use of an audio conference call held over a telecommunications network between multiple participants located at different geographical locations. This is well-known as a means of conducting business communications. However, when the number of participants in a call is more than two, it can be difficult for the participants to work out who of them is speaking at any given time. This problem is a consequence of the participants not being in direct line of sight with each other and therefore having to rely solely upon an audio signal to identify who is speaking on the other end of the call. The problem is exacerbated when conducting a conference call over a conventional plain old telephone service (POTS) network, because the useable voice frequency band over a POTS network is limited to approximately 300 Hz to 3,400 Hz, i.e. a small proportion of the frequency band (around 20 Hz to 20,000 Hz) representative of the range of human hearing. Therefore, in addition to the listening participants having to rely solely upon their auditory sense to identify who is speaking, those same participants have to base the identification on an audio signal which is compressed. Speaker identification can be further hampered by any distortion in the speech of the speaking participant which may be introduced by transmission over a POTS network.

The same difficulty of the listener(s) identifying who is speaking can also arise in a conference or lecture having a plurality of participants located in a single room (such as a crowded lecture theatre). Where there are a large number of participants in a single room, it can be hard for those listening to determine who is speaking amongst the participants, even if the speaker is in direct line of sight with those listening.

The use of voice recognition systems which are able to identify who is speaking based upon recognising a given person's voice from their voice signature is known. However, such systems would require training to establish a voice profile sufficient to identify a given person, as well as a database containing the voice profiles of all persons on a given call. Such a system would therefore be costly in terms of both time and infrastructure.

Consequently, there is a need for an improved means of identifying who is speaking in a verbal communication scenario between a listener and a speaker where the listener cannot easily see who is speaking

SUMMARY OF INVENTION

Accordingly, an embodiment of the invention provides an apparatus for use in a verbal communication between a speaker and at least one listener, the speaker and the at least one listener forming all or part of a plurality of participants, wherein the speaker and the at least one listener are spatially separate from each other, the apparatus operable to provide the listener with a sensory output associated with the identity of the speaker; the apparatus comprising: an identification device, wherein the identification device is wearable or carriable by a speaker, the identification device comprising a vibration sensor for detecting vibrations associated with speech of the speaker, wherein the identification device is configured to store identification data representative of the identity of either or both of the speaker and the identification device, whereby the identification device is associatable with the identity of the speaker, wherein the identification device is operable such that in response to the vibration sensor detecting vibrations associated with speech of the speaker, the transmitter transmits an identification signal comprising or generated from the stored identification data; the apparatus further comprising a display device for use by a listener, the display device operable to receive such an identification signal and to generate from the received identification signal a sensory output indicating the identity of either or both of the speaker and the identification device.

For the purpose of the present invention, by "plurality" of participants is meant two or more participants. Further, the "speaker" and the "listener" may also be referred to within this text as the "speaking participant" and the "listening participant" respectively, with the terms used interchangeably.

Embodiments of the present invention have application in any verbal communication scenario between a speaker and a listener where the listener cannot easily see who is speaking, thereby hindering the listener's ability to establish the speaker's identity. Applications may include but are not limited to:

Use in a conference or lecture having a plurality of participants to help establish the identity of who is speaking at any given time. Where there are a large number of participants in a single room (such as a crowded lecture theatre), it can be hard for those listening (i.e. the "listeners") to determine who is speaking amongst the participants even if the speaker is in direct line of sight with those listening. The apparatus of an embodiment provides a means of readily enabling a listener to determine the identity of who is speaking in a crowded space.

Use in telecommunications or radio applications where the speaker and listener are not in direct line of sight with each other. The apparatus of an embodiment would be particularly useful in an audio communications conference undertaken over a telecommunications or radio network between a plurality of participants located at different geographical locations corresponding to different nodes of the network. Non-limiting examples of telecommunications networks with which the apparatus of an embodiment may be used include a plain old telephone service (POTS), a cellular telephone network and/or voice over internet protocol (VOIP). An embodiment would also be beneficial for use in radio communications between a pilot on an aircraft and an air traffic controller and/or other aircraft. Alternatively, an embodiment would be beneficial when used as part of a radio communications system for ground-based transport—such as for use by a taxi company or lorry haulage company.

When considering use of embodiments of the present invention in any such "verbal communication" scenario having a plurality of participants, it is worth highlighting that each participant may be speaking or listening at different times. Therefore, the roles of "speaker" and "listener" are not necessarily fixed. This can be understood more clearly when considering use of embodiments of the present invention during an audio communications conference over a telecommunications or radio network between a plurality of different participants—a given participant may be a "speaker" at one instance in the conference and a "listener" at another instance in the conference. Therefore, when describing the use of the identification device and the display device of embodiments of the present invention, the terms "speaker" and "listener" as used herein can apply to one and the same person (depending upon whether that person happens to be speaking or listening at a given point in time during the verbal communication).

Having the identification device configured to store identification data representative of the identity of either or both of the speaker and the identification device can be enabled in various different ways. Non-limiting examples may include the identification device provided in the form of an employee ID tag, with the tag containing a chip encoded with identification data representative of the identity of a given employee. The identification data may take the form of the name and employee number of the employee. Alternatively, the identification data may include one or both of a colour and a shape associated with a given identification device. Taking the non-limiting example of an audio communications conference conducted over a telecommunications or radio network between a plurality of participants at different nodes of the network, each of the participants to the conference may be provided with their own identification device configured with identification data representative of a visible marking uniquely linked to that identification device. This unique linkage may take the form of each identification device having a unique visible marking in the form of a colour, a shape or a combination thereof, with a different colour and/or shape provided on each identification device, and with the identification device including a chip or other storage means encoded with identification data representative of the colour and/or shape. The use of such colour and/or shape provides an example of where the stored identification data would be representative of the identity of the identification device itself and would provide the benefit of avoiding the need for the identification data stored on the identification device to contain any personal information (for example, name, date of birth and/or address) of any of the participants.

The sensory output, in an embodiment, comprises one or more of a visual output, a tactile output and an audible output. An audible output may take the form of an auditory voiceover providing the name of the speaker, although it is acknowledged that this may potentially impede the ability of the listener(s) to hear what the speaker is saying. For those reasons, a visual output is preferred. The visual output takes the form of any visual representation sufficient to establish the identity of either or both of the speaker and the speaker's identification device to the listener (based upon the information contained in the identification signal). For example, the visual output may simply be a text representation of the name of the speaker, or any alphanumeric identifier representative of either of both of the speaker and the identification device. Alternatively, the visual output may take the form of colour and/or shapes. For example, where each identification device is provided with its own unique visible marking in the form of a colour, a shape or combination thereof and the identification data is representative of the colour and/or shape (as outlined in a preceding paragraph), the sensory output provided on the display device may be a visual representation of the colour and/or shape. Alternatively, a tactile output may take the form of Braille (being suitable for blind participants) or vibrations (such as the output of different vibratory signals corresponding to the different identification signals transmitted from different identification devices).

In an embodiment, the identification device comprises input means operable for the speaker to pre-configure the identification device with the identification data. The provision of such input means for pre-configuring the identification device would allow a speaker to pre-configure a given identification device with identification data representative of their own identity. In use, in an embodiment, such pre-configuration would occur before commencement of the "verbal communication". Explaining further, when considering use in air ground communications between a pilot in an aircraft and an air traffic controller, the pilot would, in an embodiment, pre-configure their identification device before take-off; when considering the example of an audio communications conference over a telecommunications or radio network between a plurality of participants, each participant would, in an embodiment, configure their identification device before the start of the conference. Conveniently, the input means comprises one or both of a keypad and an audio recording device. The speaker would therefore be able to pre-configure an identification device with identification data such as their name (or any other personal identifier) by way of a keyboard input and/or an audio input.

In an embodiment, the identification device is configured to be re-associatable with the identity of another person. This feature according to an embodiment of the present invention would ensure that the identification device is not limited to being permanently associated with a given person, thereby ensuring that the identification device could be used by another person at a future time. When considering the use of the apparatus of embodiments of the present invention within an organisation having a large number of employees, the feature of "re-associability" avoids having to provide every employee with their own identification device, with it being unlikely that all employees would be participating in the same "verbal communication" simultaneously. Further, the feature of re-associability also provides the ability to re-use a given identification device with any number of people over a period of time.

It is envisaged that in use during the "verbal communication" scenario, all of the participants would be provided with their own wearable or carriable identification device. This would thereby ensure that each participant possesses means suitable for generating an identification signal uniquely associated to them when they speak. The number of display devices necessary would be dependent upon the particular verbal communication scenario. Considering use of embodiments of the present invention during a conference or lecture having a number of participants in a single room, it may be sufficient for there to be only a single common display device which could be viewed by all of the participants. However, considering use of embodiments of the present invention during an audio communications conference undertaken over a telecommunications (or radio) network between a plurality of participants located at different geographical locations corresponding to different nodes of the network, it is envisaged that at least one display device would be provided at each node of the network. This would thereby provide the ability for those participant(s) present and listening at each node of the network to be given a real-time sensory indication of who is speaking at a different node, based upon an identification signal received over the network from the identification device of the participant who is speaking.

In an embodiment, the identification device is configured such that the transmitter only transmits the identification signal after a minimum duration of continuous speech from the speaker. This feature according to an embodiment of the present invention has the beneficial effect of avoiding the display device being triggered based upon the speaker coughing or sneezing, thereby helping to avoid false indications of a participant speaking during use of the apparatus. Conveniently, the minimum duration is between 0.5 and 2 seconds. Having too large a minimum duration would risk an unacceptable time lag between a) the speech of a speaker first being heard by the listener(s) and b) the display device (for the listener(s)) receiving the identification signal to generate the sensory output of the identity of who is speaking.

In an embodiment, the identification device is locatable adjacent the neck or chest of the speaker. This feature of the present invention assists in better ensuring that the vibration sensor is able to detect vibrations from use of the vocal chords of the speaker. The identification device may conveniently be attached to a necklace for wearing about the neck of a speaker. Conveniently, the identification device may be handheld, affixable to an item of clothing worn by a speaker, or affixable directly to a speaker's body (for example, by the use of straps or adhesive tape)—these all falling within the scope of the identification device being "wearable or carriable".

Having the identification device so that it is worn or carried in use by a participant provides proximity of the identification sensor to that participant. This provides the advantage of more easily being able to calibrate the vibration sensor so that it only detects speech from the participant who is wearing or carrying the identification device. This advantage is especially relevant where other people are present in the same room as a particular participant, because it avoids the identification device being triggered by speech from people other than the participant who is wearing or carrying the particular identification device.

The transmitter of the identification device may be configured to transmit the identification signal as an audio signal having a frequency between 20 Hz and 20,000 Hz. Such a frequency range corresponds to the commonly accepted range of frequencies audible to human hearing. Conveniently the transmitter is configured to transmit the identification signal as an audio signal having a frequency within a narrower frequency band of between 300 Hz and 3,400 Hz. This narrower frequency band is particularly suitable for direct transmission of the identification signal over a telecommunications network in the form of a plain old telephone service (POTS), for which the transmissible audio frequency range represents only a portion of the frequency range commonly associated with the range of human hearing (20 Hz to 20,000 Hz).

Alternatively, the transmitter may be configured to wirelessly transmit the identification signal at a frequency above 20,000 Hz, the apparatus further comprising a first encoder communicatively couplable between the identification device and a telecommunications or radio network, the first encoder operable to receive and convert the transmitted identification signal to one of:
 a) an audio signal having a frequency in the range 20 Hz to 20,000 Hz (or alternatively in the range 300 Hz to 3,400 Hz); or
 b) an encrypted digital signal, wherein for b) the display device comprises or is communicatively couplable with a decoder for decoding the encrypted digital signal.

The transmission of the identification signal from the identification device at a frequency above 20,000 Hz has the beneficial effect of ensuring that it is not heard by the speaker and therefore does not interfere with their concentration and affect their speech. Subsequent conversion by the first encoder to an audio frequency in the range 20 Hz to 20,000 Hz is beneficial when the identification device of the apparatus is used with a telecommunications or radio network able to transmit audio signals corresponding to the full range of human hearing; whereas conversion to an audio signal having a frequency in the range 300 Hz to 3,400 Hz is particularly beneficial when the apparatus is used with a telecommunications network in the form of a POTS.

In addition to the use of a first encoder as outlined above, the identification device may also be operable to encode the identification signal for transmission by the transmitter as a wireless Bluetooth signal, wherein the identification device and the first encoder are Bluetooth-pairable to each other. The use of the Bluetooth protocol provides a secure way to wirelessly connect and exchange information between the identification device and the first encoder.

Conveniently, the first encoder is integrated within a terminal connectable to a node of a telecommunications or radio network, the terminal operable for audio communications to and/or from the network. In one example, the terminal may be a telephone connectable over a POTS, the telephone having a microphone for detecting speech of one or more participants located in proximity thereto and a loudspeaker for conveying audio signals received over the POTS to anyone listening.

In an embodiment, apparatus further comprises a filter integrated within or communicatively connectable to the display device, wherein the filter is operable to receive a combined signal comprising both the identification signal and an audio signal of the speech of the speaker and is further operable to filter the combined signal to extract the identification signal from the combined signal prior to audio output of the filtered signal to the listener. The use of such a filter helps to ensure that the listener(s) hear the words spoken by a participant speaking at another node of the network without interference or distortion from the identification signal.

In an embodiment, the display device is integrated within a terminal connectable to a node of a telecommunications or radio network, the terminal operable for audio communications to and/or from the network. This feature according to embodiments of the present invention provides the advantage of providing a single integrated terminal which can serve for providing audio input and audio output to/from a telecommunications or radio network, whilst also serving the function of providing a visual indication of who is speaking at another node of the network. Alternatively or in addition, the identification device is integrated within a terminal connectable to a node of a telecommunications or radio network, the terminal operable for audio communications to and/or from the network; for example, the terminal may be a cellular telephone which may function as both the identification device and the display device.

In an embodiment of the present invention, there is provided a terminal operable for audio communications to and/or from a telecommunications or radio network, wherein the terminal comprises one or both of the identification device and the display device of embodiments of the present invention. In an embodiment, the terminal may be a cellular telephone.

In an embodiment of the present invention, there is provided a kit of parts comprising the identification device and the display device of embodiments of the present invention. Such a kit would be of value because it would provide a person with both:
 a) the means (i.e. the "identification device") necessary to generate an identification signal associated with their identity—being suitable for use by that person when being a speaker during the verbal communication; and b) the means (i.e. the "display device") necessary to provide a visual output indicating the identity of who is speaking when that person is a listener during the verbal communication.

In an embodiment of the present invention, there is provided a method of identifying who is speaking in a verbal communication between a speaker and at least one listener, the speaker and the at least one listener forming all or part of a plurality of participants, wherein the speaker and the at least one listener are spatially separate from each other, the method providing the at least one listener with a sensory output associated with the identity of the speaker, the method comprising: providing an identification device, wherein the identification device is wearable or carriable by the speaker, the identification device comprising a vibration sensor for detecting vibrations associated with speech of the speaker, wherein the identification device stores identification data representative of the identity of either or both of the speaker and the identification device, whereby the identification device is associated with the identity of the speaker; detecting with the vibration sensor vibrations associated with speech of the speaker, the detecting performed when the speaker is wearing or carrying the identification device; in response to the detection of the vibrations, transmitting from the identification device an identification signal comprising or generated from the stored identification data; and providing a display device for use by the at least one listener, wherein the display device receives such an identification signal and generates from the received identification signal a sensory output indicating the identity of either or both of the speaker and the identification device.

The method of an embodiment of the present invention may also incorporate steps corresponding to the functionality provided by various possible features of the apparatus outlined above.

BRIEF DESCRIPTION OF DRAWINGS

Embodiments of the invention are described with reference to the following accompanying drawings.

Please note that the figures are not drawn to scale, and are intended to be non-limiting examples of various possible embodiments of the invention.

DESCRIPTION OF EMBODIMENTS

Figure 1:
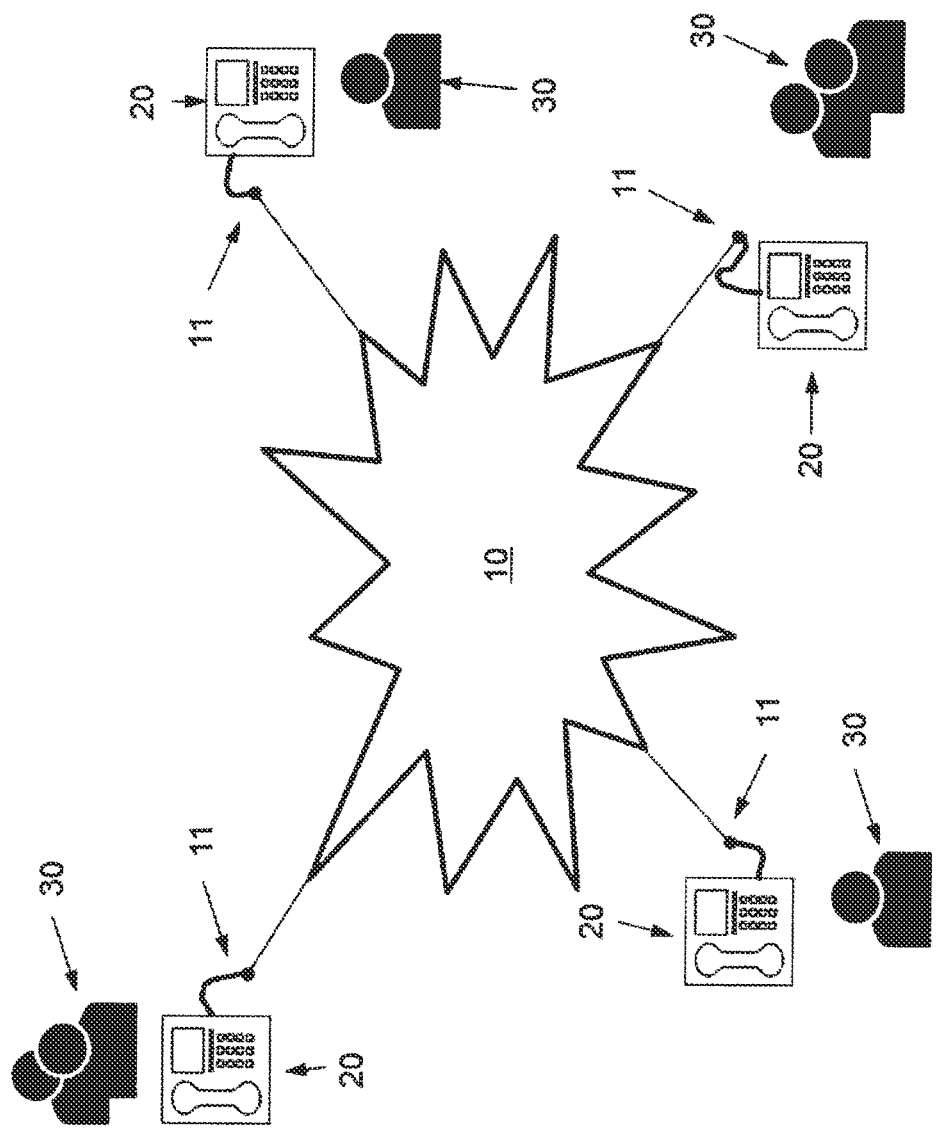
FIG. 1 shows a representation of a telecommunications network having a number of different nodes.

FIG. 1 shows a simplified representation of a telecommunications network 10 for use during an audio communications conference, the network having a number of different nodes 11. Each of the nodes 11 corresponds to a different geographic location. In the embodiment shown in FIG. 1, a terminal 20 is connected to the telecommunications network 10 at each respective node 11, with the terminal providing for audio communications to and from the telecommunications network 10. Examples of embodiments of the present invention are described in FIGS. 2, 3 and 4 when the telecommunications network is a plain old telephone service (POTS), with the use of POTS systems remaining widespread for audio conferencing. However, as can be understood by earlier parts of the description, embodiments of the present invention are applicable for use with other forms of telecommunication network (for example, a cellular telephone network and/or voice over internet protocol (VOIP)).

In an alternative embodiment not shown in the drawings, the network 10 would be a radio communications network. One such radio communications network 10 is a radio network forming part of a radio communications system between an aircraft and a ground station, with the aircraft and ground station corresponding to different nodes 11 of the network.

During an audio communications conference between a plurality of participants 30, one or more of the participants is located at each nodal location 11 (as illustrated in FIG. 1).

Figure 2:
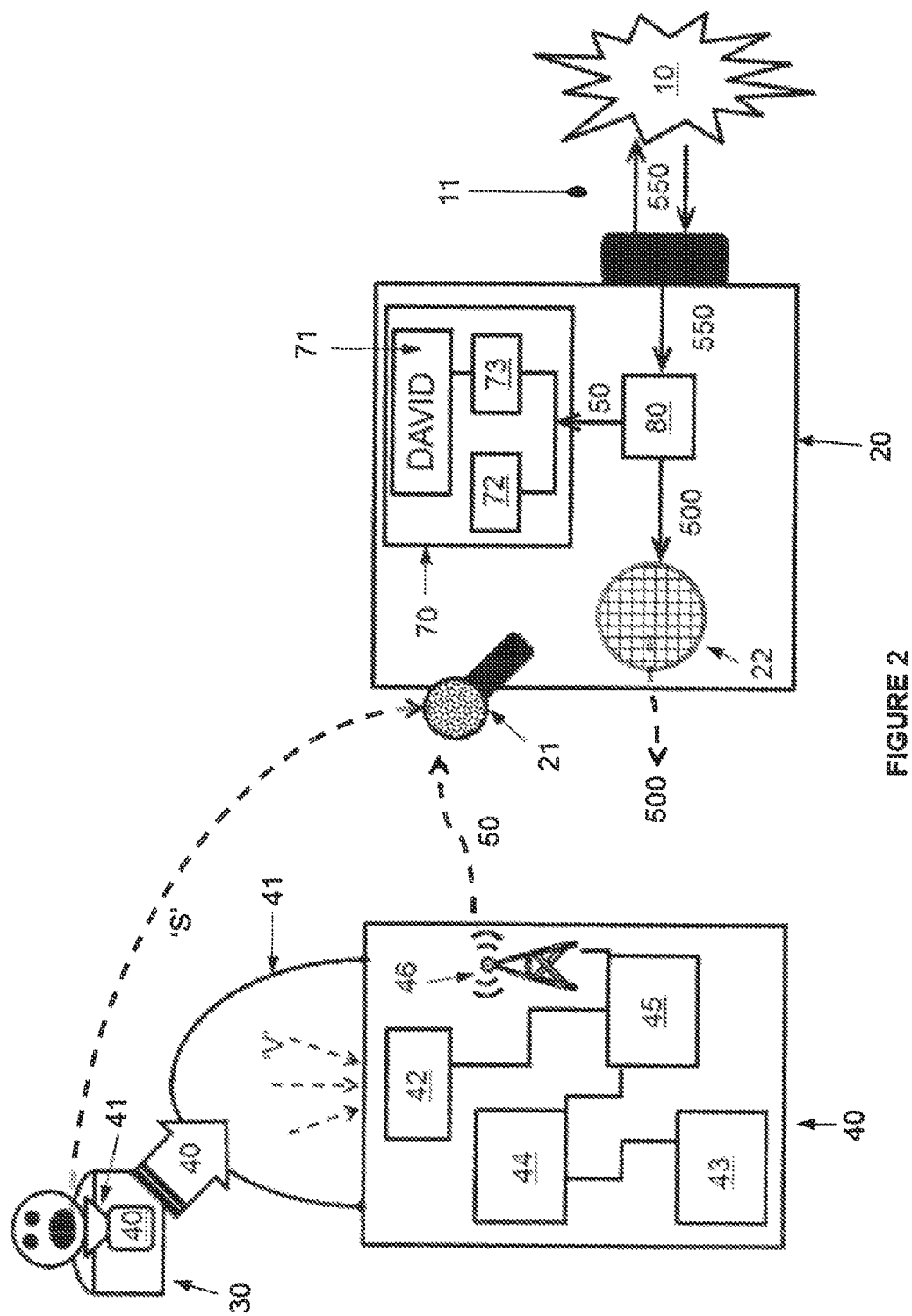
FIG. 2 shows a first embodiment of the invention when used with the telecommunications network shown in FIG. 1.
Figure 3:
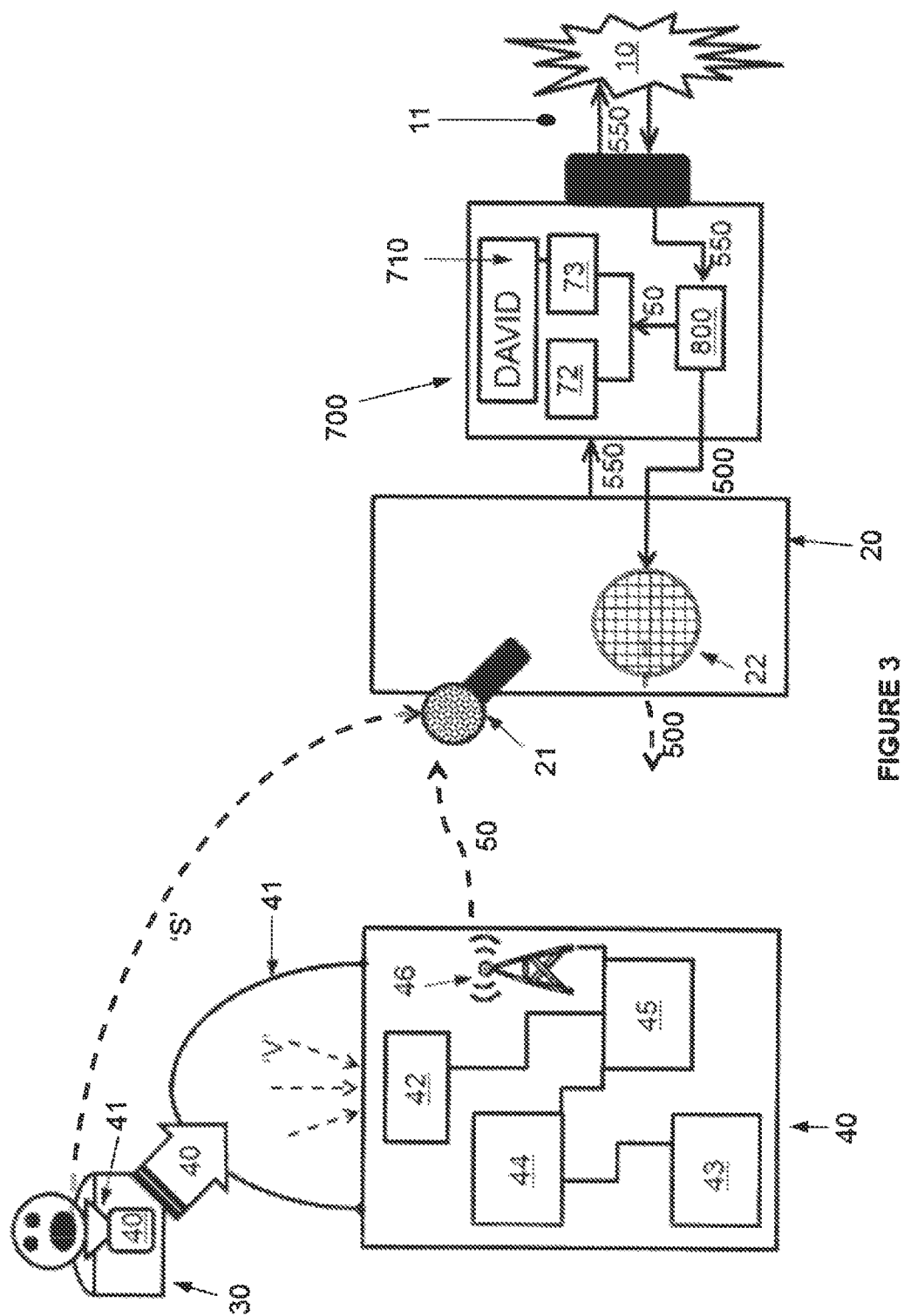
FIG. 3 shows a second embodiment of the invention when used with the telecommunications network shown in FIG. 1.
Figure 4:
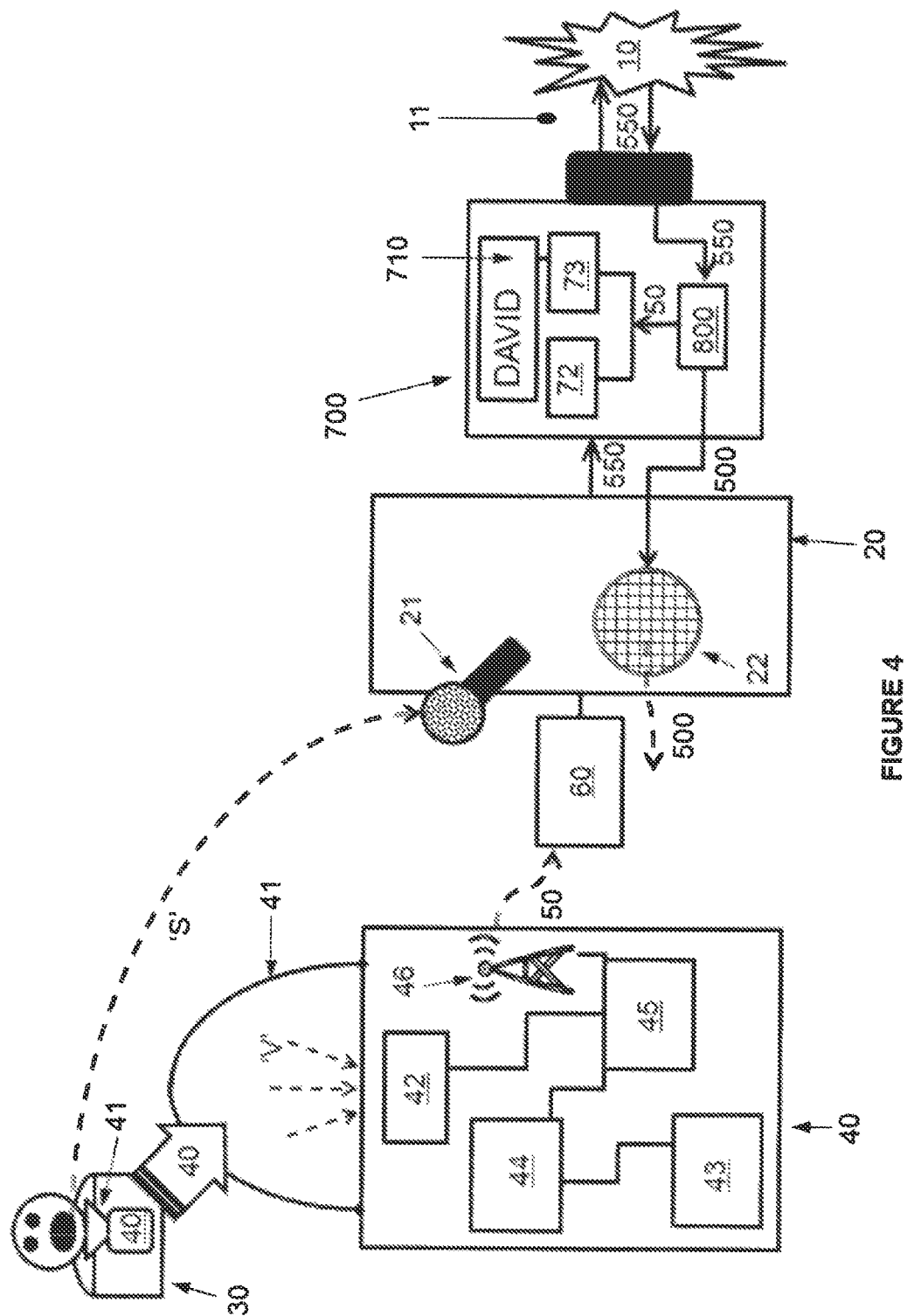
FIG. 4 shows a third embodiment of the invention when used with the telecommunications network shown in FIG. 1.

FIGS. 2, 3 and 4 show an exemplary representation of embodiments of the present invention from the perspective of a participant who at one point in time is speaking during the audio communications conference (i.e. acting as a "Speaker") and at another point in time is listening (i.e. acting as a "Listener"). The apparatus has an identification device 40 and a display device 70.

Without seeking to limit the scope of the invention as outlined in the claims, the form and function of the identification device 40 and display device 70 is outlined below.

The embodiment of FIG. 2 shows an identification device 40 provided on a necklace 41. In use, the necklace 41 would be worn around the neck of a given one of the participants 30, so that the identification device is located proximate the neck and thereby the vocal chords of that participant. Each participant 30 to the audio communications conference is provided with their own identification device 40 to be worn or carried by them. The identification device 40 includes a housing incorporating a vibration sensor 42, an input means 43, a memory 44, a processor 45, and a transmitter 46.

FIG. 2 also shows a terminal 20 in the form of a conference-enabled telephone connected to the telecommunications network 10, the network having the form of a plain old telephone service (POTS). The terminal 20 has a microphone 21 and a loudspeaker 22 for enabling audio communication to and from the network 10.

Prior to commencement of the audio communications conference, each participant 30 would use the input means 43 to input identification data into the memory 44 of their own respective identification device 40. The identification data would be representative of the identity of that participant. The form of the input means 43 is not shown, but as outlined in earlier parts of the description it may include a key pad and/or an audio recorder. The identification data might take the form of the name of the participant, or another identifier uniquely associated with the participant's identity (for example, an employee staff number). The act of pre-configuration ensures that the identification device 40 is twinned (i.e. associated) with the identity of a given participant 30 until pre-configured with identification data of another person.

Upon the participant 30 commencing speaking (at which point they become a "Speaker" for the purposes of the present invention), the vibration sensor 42 detects vibrations 'V' (see FIG. 2) associated with the speech S of the Speaker 30. The proximity of the identification device 40 to the vocal chords of the Speaker 30 assists the vibration sensor 42 in detecting the onset of speech S from the Speaker. However, in alternative embodiments not shown in the figures, the identification device 40 is handheld by the participant 30, or attached to an item of clothing worn by the participant.

In response to the vibration sensor 42 detecting speech S of the Speaker 30, the processor 45 and memory 44 cooperate with the transmitter 46 to cause the transmitter to wirelessly transmit an identification signal 50. The identification signal 50 is generated from or comprises the identification data that was input during the pre-configuration step outlined above. In the embodiment shown in FIG. 2, the processor 45 executes computer code stored in the memory 44, the computer code operating upon the identification data to generate the identification signal 50 therefrom. The computer code is such as to ensure that the transmitter 46 only transmits the identification signal 50 after the vibration sensor 42 has detected a minimum duration of continuous speech S from the Speaker. For the embodiment of FIG. 2, the identification signal 50 is an audio signal in the form of a "chirp" having a frequency in the range 300 Hz to 3,400 Hz, with the chirp representing a compressed form of the identification data.

The "chirp" 50 (i.e. the "identification signal") is detected by the microphone 21 of the terminal 20, with the microphone 21 also detecting the speech S of the Speaker 30. The terminal 20 then sends a combined signal 550 containing both i) the chirp 50 and ii) an audio signal 500 representing the speech S of the Speaker 30, across the network 10 to corresponding terminals 20 of the other participants 30 located at the other nodes 11 of the network. Each of these other participants 30 who receives the combined signal 550 becomes a "Listener" for the purposes of embodiments of the present invention.

For convenience, FIG. 2 is also used to describe embodiments of the present invention from the perspective of such a "Listener".

FIG. 2 shows the display device 70 integrated into the terminal 20, with the display device including a display screen 71. Also integrated into the terminal 20 is a filter 80. On the terminal receiving the combined signal 550, the signal first passes through the filter 80, which filters the combined signal 550 to extract the identification signal 50 from the combined signal 550. After filtering, the extracted identification signal 50 is then conveyed to the display device 70. As shown in FIG. 2, the display device 70 includes a memory 72 and a processor 73, with the processor 73 executing computer code stored in the memory 72. The computer code operates upon the extracted identification signal 50 to generate a sensory output in the form of a visual representation of the identity of the Speaker, the visual representation being output to the display screen 71. In the embodiment shown in FIG. 2, the visual representation is the name of the Speaker. The speech signal 500 is then able to be conveyed to the loudspeaker 22 of the terminal 20 to enable the Listener to hear what the Speaker was saying.

An embodiment is shown in FIG. 3, with those features in common with the embodiment of FIG. 2 having the same reference numerals. In the embodiment of FIG. 3, the display device 700 is provided as a standalone module which is structurally distinct from the terminal 20 and connected in-line between the network 10 and the terminal 20. The filter 800 is shown integrated into the display device 700. The filter 800 functions in a similar manner to that of the filter 80 in the embodiment of FIG. 2, thereby enabling a clean audio signal containing only the speech of the Speaker to be conveyed to the terminal 20 for output via the loudspeaker 22 to the Listener. Further, the identification signal 50 extracted from the combined signal 550 would be processed within the display device 70 to generate a visual representation on the display screen 710 of the identity of the Speaker. This alternative form of display device 700 would have the advantage over the embodiment of FIG. 2 of not necessarily requiring the terminal 20 to be modified, thereby permitting a conventional conference-enabled telephone to be used as the terminal.

For the embodiment of FIG. 3, each participant would be provided with a kit of parts, the kit containing both the identification device 40 and the display device 700, where the identification device and display device are usable with but structurally distinct from the terminal 20.

An embodiment is shown in FIG. 4. This embodiment is a variation of the embodiment of FIG. 3. In contrast to the embodiments of FIGS. 2 and 3, the embodiment of FIG. 4 includes an encoder 60, where the encoder 60 is spatially distinct and separate from the identification device 60 and the terminal 20, and connected to the terminal 20 by a wired connection. In an alternative embodiment not shown in the figures, the encoder 60 is integrated within the terminal 20 itself. The embodiment of FIG. 4 also differs from that of FIGS. 2 and 3 in that the identification signal 50 wirelessly transmitted by the transmitter 46 is a non-audible signal above 20,000 Hz. The non-audible identification signal 50 is received by the encoder 60, with the encoder 60 acting to convert the identification signal 50 to an audio signal having a frequency in the range 300 Hz to 3,400 Hz, with the converted identification signal 50 then conveyed via the wired connection to the terminal 20. The terminal 20 then sends the converted identification signal 50 across the network 10 along with an audio signal of the speech 500 of the Speaker 30. An advantage of the embodiment of FIG. 4 over that of FIGS. 2 and 3 is that the wireless transmission of the identification signal 50 from the identification device 40 to the encoder 60 as a non-audible signal (i.e. having a frequency above 20,000 Hz) avoids the identification signal interfering with the concentration and speech of the Speaker 30. In an embodiment not shown in the figures, the identification signal 50 may be wirelessly transmitted as a Bluetooth signal, with the identification device 40 and encoder 60 being Bluetooth-pairable.

Figure 5:
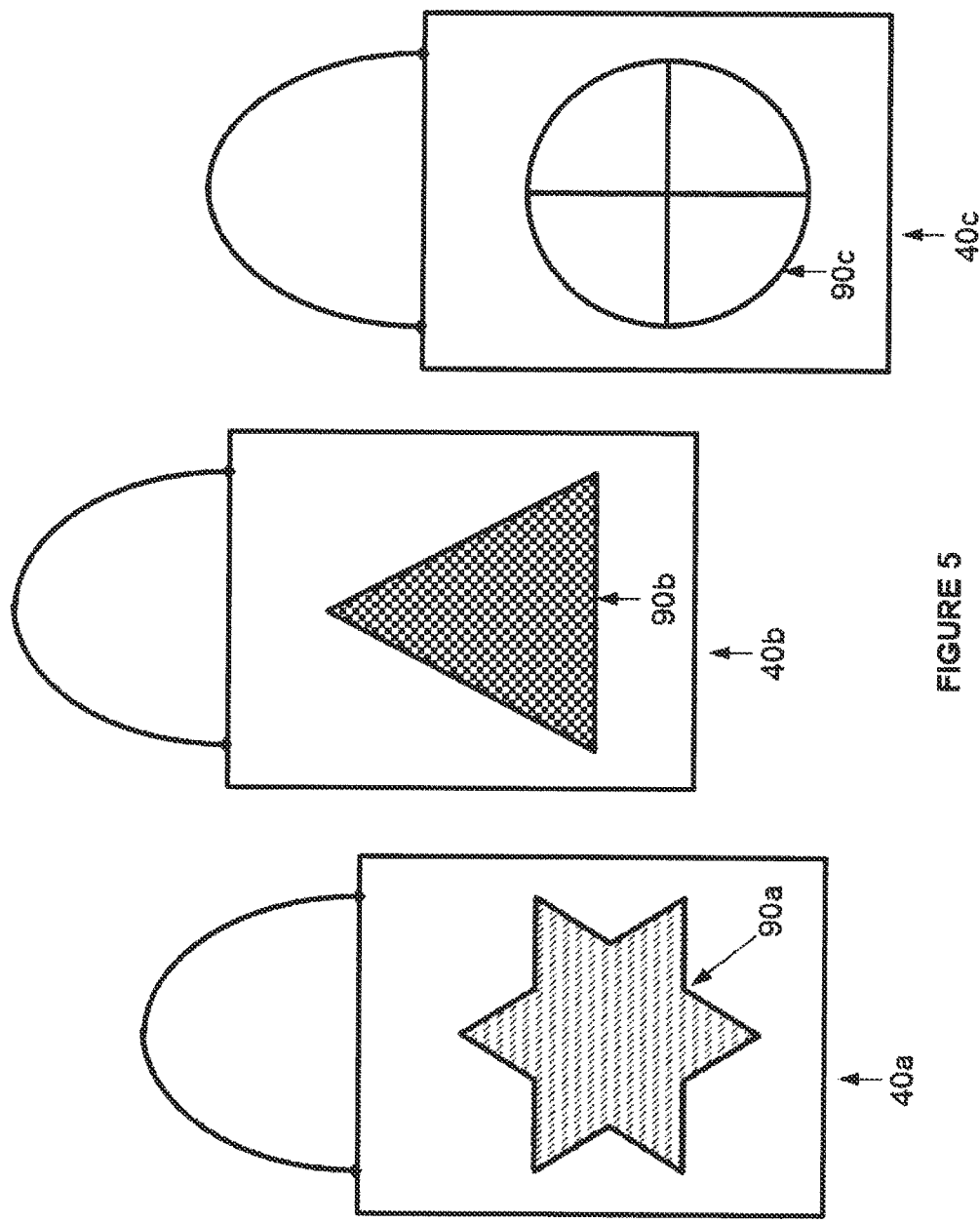
FIG. 5 shows an embodiment of the invention in which the housings of three different identification devices are each provided with their own unique visible marking.

FIG. 5 shows a view of the external view of the housing of three different identification devices 40a, 40b, 40c. Each of the identification devices 40a, 40b, 40c is provided with its own unique visible marking 90a, 90b, 90c on the exterior surface of the housing. The embodiment shown in FIG. 5 shows these visible markings 90a, 90b, 90c being in the form of a shape having a particular texture or colour. Each of the identification devices 40a, 40, 40c has its memory 44 encoded with identification data representative of its respective visible marking 90a, 90b, 90c. In use, the identification signal 50 transmitted from each identification device 40a, 40b, 40c would correspond to each device's marking 90a, 90b, 90c. Although not explicitly shown in any of the figures, the display device 70, 700 would display a visual representation corresponding to the visual marking of the identification device belonging to whichever participant 30 spoke.

The description uses examples to disclose the invention and also to enable a person skilled in the art to make and use the invention. For the avoidance of doubt, the invention as defined in the claims may include within its scope other examples that occur to those skilled in the art which may differ from those examples indicated in the figures of this document.

What is claimed is:

1. An apparatus for use in a verbal communication between a speaker and at least one listener, where the speaker and the at least one listener form all or part of a plurality of participants, wherein the speaker and the at least one listener are spatially separate from each other, the apparatus operable to provide the listener with a sensory output associated with the identity of the speaker; the apparatus comprising:

an identification device, wherein the identification device is wearable or carriable by the speaker, the identification device comprising:
- a vibration sensor for detecting vibrations associated with speech of the speaker;
- a transmitter; and
- an input device including one of a key pad and audio recorder for receiving identification data from the speaker, the identification data being representative of the identity of the speaker and for associating the speaker with the identification device in a pre-configuration step;
- the identification device being configured to store the identification data;
- wherein, in response to the vibration sensor detecting vibrations associated with the speech of the speaker, the transmitter is configured to transmit an identification signal comprising or generated from the stored identification data; and a display device for use by a listener, the display device configured to receive the identification signal and to generate from the received identification signal a sensory output indicating the identity of either or both of the speaker and the identification device.

2. The apparatus of claim 1, wherein the identification device is configured to be re-associatable with the identity of another person.

3. The apparatus of claim 1, wherein the sensory output comprises one or more of a visual output, a tactile output, and an audible output.

4. The apparatus of claim 1, wherein the identification device is provided with a visible marking, wherein the stored identification data is representative of the visible marking.

5. The apparatus of claim 1, wherein the identification device is configured such that the transmitter only transmits the identification signal after a minimum duration of continuous speech from the speaker.

6. The apparatus of claim 1, wherein the transmitter of the identification device is further configured to transmit the identification signal as an audio signal having a frequency between 20 Hz and 20,000 Hz.

7. The apparatus of claim 1, wherein the transmitter is further configured to wirelessly transmit the identification signal at a frequency above 20,000 Hz, the apparatus further comprising:
- a first encoder communicatively couplable between the identification device and a telecommunications or radio network, the first encoder configured to receive and convert the transmitted identification signal to one of:
  - a) an audio signal having a frequency in the range 20 Hz to 20,000 Hz; or
  - b) an encrypted digital signal, wherein for b) the display device comprises or is communicatively couplable with a decoder for decoding the digital signal.

8. The apparatus of claim 1, further comprising a filter integrated within or communicatively connectable to the display device, wherein the filter is configured to receive a combined signal comprising both the identification signal and an audio signal of the speech of the speaker and is further configured to filter the combined signal to extract the identification signal from the combined signal prior to audio output of the filtered signal to the listener.

9. The apparatus of claim 1, wherein the display device and/or the identification device is integrated within a terminal connectable to a node of a telecommunications or radio network, the terminal operable for audio communications to and/or from the network.

10. A terminal connectable to a node of a telecommunications or radio network, the terminal operable for audio communications to and from the network, the terminal comprising one or both of:
an identification device, wherein the identification device is wearable or carriable by a speaker, the identification device comprising:
- a vibration sensor for detecting vibrations associated with speech of the speaker; and
- a transmitter; and
- an input device including one of a key pad and audio recorder for receiving identification data from the speaker, the identification data being representative of the identity of the speaker, the identification data for associating the speaker with the identification device in a pre-configuration step;
- the identification device being configured to store the identification data;
- wherein, in response to the vibration sensor detecting vibrations associated with the speech of the speaker, the transmitter is configured to transmit an identification signal comprising or generated from the stored identification data; and
a display device for use by a listener, the display device configured to receive the identification signal and to generate from the received identification signal a sensory output indicating the identity of either or both of the speaker and the identification device.

* * * * *